United States Patent
Montague et al.

(10) Patent No.: US 6,214,086 B1
(45) Date of Patent: Apr. 10, 2001

(54) DIRECT REDUCED IRON DISCHARGE SYSTEM AND METHOD

(75) Inventors: Stephen Craig Montague, Midland; Brian William Voelker, Concord, both of NC (US)

(73) Assignee: Midrex International B.V. Rotterdam, Zurich Branch (CH)

( * ) Notice: Subject to any disclaimer, the term of this patent is extended or adjusted under 35 U.S.C. 154(b) by 0 days.

(21) Appl. No.: 09/415,398

(22) Filed: Oct. 8, 1999

Related U.S. Application Data

(60) Provisional application No. 60/150,036, filed on Aug. 20, 1999.

(51) Int. Cl.[7] .................................................. G21B 13/02
(52) U.S. Cl. ............................................. 75/490; 266/195
(58) Field of Search ............................ 75/488, 489, 490, 75/491, 492; 266/195

(56) References Cited

U.S. PATENT DOCUMENTS 6,132,489 * 10/2000 Villarreal-Trevino .................. 75/488

* cited by examiner

Primary Examiner—Melvyn Andrews
(74) Attorney, Agent, or Firm—Dougherty & Clements LLP

(57) ABSTRACT

A method and apparatus for simultaneously supplying varying proportions of hot and cold direct reduced iron(DRI) material from a source of hot DRI for melting, storage, briquetting, or transport. The system uses gravity to transport hot DRI material from a reduction furnace to a furnace discharge section, which transports desired amounts to a cooling receptacle and to a hot DRI vessel. The cooling section of the apparatus is connected to the furnace discharge section through a dynamic seal leg. The hot section is also connected to the furnace discharge section through separate a dynamic sealing leg and can feed a surge vessel, a briquetter, a storage vessel or a melting furnace. The method of operation is also disclosed.

10 Claims, 5 Drawing Sheets

DIRECT REDUCED IRON DISCHARGE SYSTEM AND METHOD

CROSS REFERENCE TO RELATED APPLICATION

This application claims the benefit of U.S. Provisional Application No. 60/150,036 filed on Aug. 20, 1999.

FIELD OF THE INVENTION

The present invention relates to a method and apparatus that simultaneously provides both hot and cold DRI (direct reduced iron) from a continuous gravity-fed supply of hot DRI material, as from a conventional direct reduction furnace.

BACKGROUND OF THE INVENTION

Sponge iron, metallized pellets, briquettes, or reduced metal materials such as direct reduced iron ("DRI"), nickel, or the like, are produced by the direct reduction of ores or metal oxides. Large quantities of metallized iron pellets are made in the direct reduction process wherein particulate iron oxide is reduced substantially to metallic iron by direct contact with a reducing gas such as a mixture of hydrogen and carbon monoxide. Throughout this specification and appended claims, the term "metallized pellets" is intended to include metal-bearing pellets such as sponge iron, briquettes, DRI, other compacted forms of reduced metal and the like which contain at least 80 percent of their metal in the metallic state with the balance being primarily in the form of metallic oxide. For these purposes, iron carbide is considered iron in the metallic state. "Metallized" in this specification does not mean coated with metal, but means nearly completely reduced to the metallic state. For ease of discussion and visualization, the majority of this specification will describe the invention as it relates to DRI, although it should be understood that the invention functions equally well with other forms of "metallized pellets" of any size, or any metal.

A problem associated with the use of DRI as a raw material to make steel or other products is its inherent tendency to reoxidize upon exposure to air or water. Exposure of a mass of hot DRI to atmospheric air and moisture causes re-oxidation of the metal ("rusting") with a significant loss of metallization. The re-oxidation also produces heat that can dramatically raise the temperature of a mass of DRI. The process of reoxidation also releases water-bound hydrogen into the immediate environment. Under proper conditions, hot DRI can ignite the liberated hydrogen resulting in additional heat, formation of additional hydrogen and possibly an explosion within transfer piping or within storage units.

DRI must be removed from a direct reduction furnace in order to be useful. Methods are needed to transport DRI while reducing the risk of re-oxidation. One common method of reducing this risk of re-oxidation is to cool the hot DRI material to a sufficiently low temperature (less than about 100° C.), to prevent the ignition of any hydrogen that is released by the oxidation process. One drawback to this method is that current DRI production systems are typically "all or nothing" propositions with respect to cooling. Either all of the hot DRI material exiting a particular furnace is cooled or none of it is cooled.

A known method of transfer is the pneumatic transfer of hot DRI materials through piping from a furnace to an exterior storage unit. Drawbacks to this method include: extensive piping is required to transfer hot DRI through significant elevation changes, input of additional energy is required to the gases utilized in pneumatic transfer, additional opportunities are present for oxygen intake into transfer piping, and size reduction of hot DRI from nugget-size to particulate-size occurs during the transfer to remote storage units because of abrasion and impact.

The present invention does not employ pneumatic transfer, and instead provides a method and apparatus for removing continuous output of hot DRI material from a direct reduction furnace and gravitationally transferring the output for subsequent processing or storage. The invention may simultaneously provide hot DRI material for subsequent steps such as melting or briquetting. The invention may also cool DRI material for transport, storage, or other use.

The disclosure of the invention refers to elements or components in the Midrex process. The Midrex process and apparatus for direct reduction are disclosed in the following U.S. Patents: U.S. Pat. No. 3,748,120 entitled "Method of Reducing Iron Oxide to Metallic Iron", U.S. Pat. No. 3,749,386 entitled "Method for Reducing Iron Oxides in a Gaseous Reduction Process", U.S. Pat. No. 3,764,123 entitled "Apparatus for Reducing Iron Oxide to Metallic Iron", U.S. Pat. No. 3,816,101 entitled "Method for Reducing Iron Oxides in a Gaseous Reduction Process", and U.S. Pat. No. 4,046,557 entitled "Method for Producing Metallic Iron Particles", all of which are hereby incorporated herein by reference.

SUMMARY OF THE INVENTION

The invention is a system for providing both hot and cold DRI from a continuous gravity-fed supply of hot DRI material. The invention is an apparatus for the simultaneous discharge of hot direct reduced iron (DRI) material and cold DRI material from a continuous supply of hot DRI. The invention has a furnace discharge section, a hot discharge section, and a cold discharge section. The furnace discharge section has a pair of discharge outlets for discharging DRI material, and a plurality of feeders. The hot discharge section gravitationally receives hot DRI from the first discharge outlet of the hot discharge cone and conveys the hot DRI through a conduit or pipe to a melting furnace or a hot transport vessel. The cold discharge section gravitationally receives hot DRI material from the other discharge outlet of the furnace discharge section, conveys the DRI to a cooler through a conduit cools the hot DRI, and discharges cold DRI.

OBJECTS OF THE INVENTION

The principal object of the present invention is to provide an improved method to simultaneously provide both hot and cold DRI from a continuous supply of hot DRI material.

Another object of this invention is to provide an improved method to simultaneously provide both hot and cold DRI from a continuous supply of hot DRI material, the hot DRI being delivered at a temperature of at least 700° C.

A further object of this invention is to provide apparatus for producing simultaneously both hot and cold DRI from a continuous supply of hot DRI material

BRIEF DESCRIPTION OF THE DRAWINGS

The foregoing and other objects will become more readily apparent by referring to the following detailed description and the appended drawings in which.

DETAILED DESCRIPTION

The invention is an efficient apparatus and method to simultaneously provide both hot and cold DRI from a continuous gravity-fed supply of hot DRI material, as from a Midrex direct reduction shaft furnace. The invention satisfies the demand for both hot DRI material as a feed to a steelmaking process, and for cool DRI material as a storable commodity for eventual use in a furnace. The transport method thus used throughout this system is gravity, not pneumatics. Since the shaft furnace is elevated, it is possible to discharge into a lower elevation pellet cooler to produce cold DRI and into a lower elevation surge vessel to temporarily store the hot DRI for down stream processing (i.e., for briquetting, melting, etc.). This arrangement provides the unique flexibility for discharging both hot and cold DRI simultaneously. Furthermore, the discharge can be adjusted to produce 100% cold DRI or 100% hot DRI or any combination in between. These adjustments can be made instantaneously without any effect on the process.

Because the present invention avoids the use of pneumatics there is minimal temperature loss of the hot DRI. In fact, hot DRI can be delivered from the surge vessel at a temperature of 700° C. or higher. There is also no loss in metallization since the entire system is sealed and DRI the product is only exposed to reducing or inert atmospheres. Gravity flow also results in negligible product degradation which cannot be avoided during pneumatic conveying. Unlike pneumatics, gravity flow can also handle a wide size range of product (as small as fines and as large as 200 mm).

Figure 1:
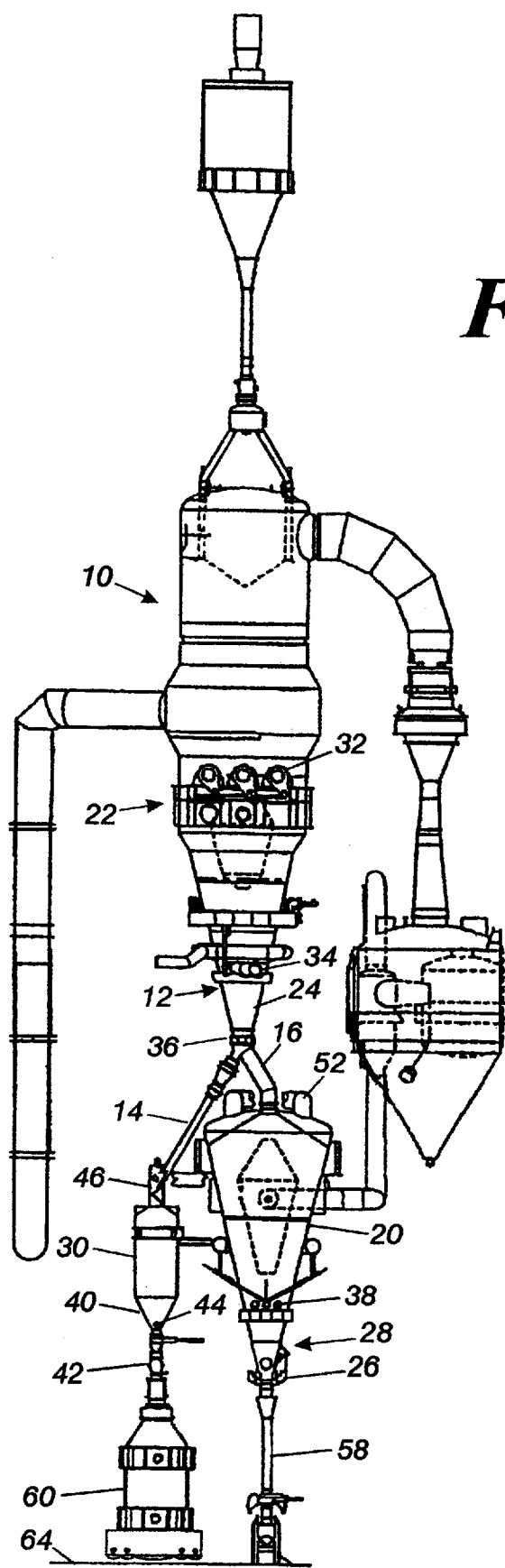
FIG. 1 is front elevational view of a direct reduction furnace with associated feed and discharge apparatus in accordance with the present invention.

Referring now to the drawings, and particularly to FIG. 1, the invented apparatus for the simultaneous discharge of hot direct reduced iron (DRI) material and cold DRI material from a continuous supply of hot DRI, such as a continuously discharging DRI furnace 10, includes a furnace discharge section 12, a hot discharge conduit 14, and a cold discharge conduit 16.

Hot discharge furnace 10 is located above a pellet cooler 20 and above a hot DRI receiving vessel such as surge vessel 30. The furnace discharge section 12 is generally conical. The furnace discharge section 12 has an upper DRI admitting area 22 and a lower discharge region 24. The admitting area 22 receives DRI material from the furnace 10. The material is transported by gravity with the assistance of upper burden feeders 32, intermediate burden feeders 34, and lower burden feeders 36 to the discharge region 20. This embodiment can have a burden discharge feeder 38, if desired. The burden feeders water are cooled.

The furnace discharge section 12 is a refractory lined cone. The cold DRI discharge rate is controlled by means of a vibratory feeder 26 at the discharge 28 of the pellet cooler 20.

The first discharge conduit 14 hermetically connects the furnace discharge section 12 to the hot DRI receiving vessel 30. The second discharge 18 connects the furnace discharge section 12 to the pellet cooler 20.

Figure 2:
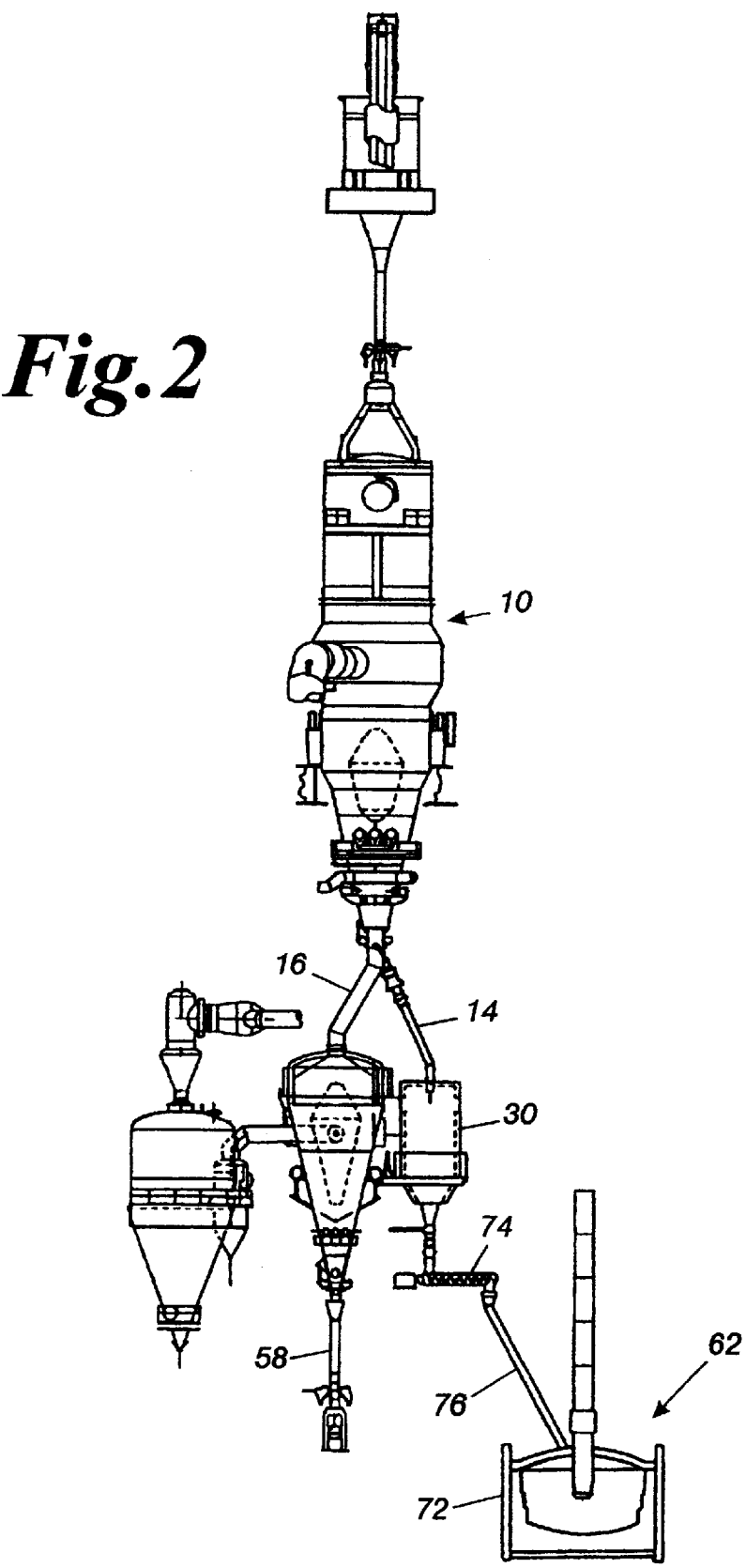
FIG. 2 is a front elevational view of a first embodiment of the invention which includes connection of a direct reduction furnace to an electric arc furnace (EAF).
Figure 3:
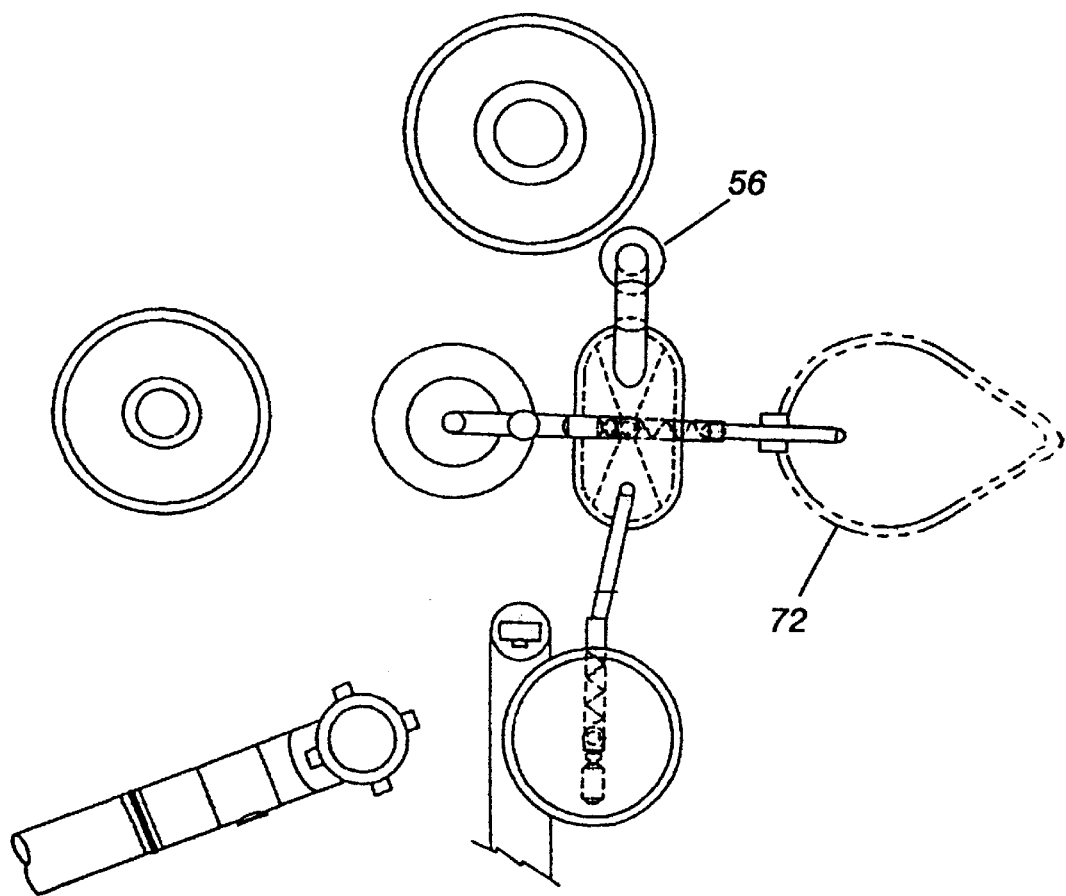
FIG. 3 is a plan view of the first embodiment of the invention which connects a direct reduction furnace to a conventional electric arc furnace (EAF).
Figure 4:
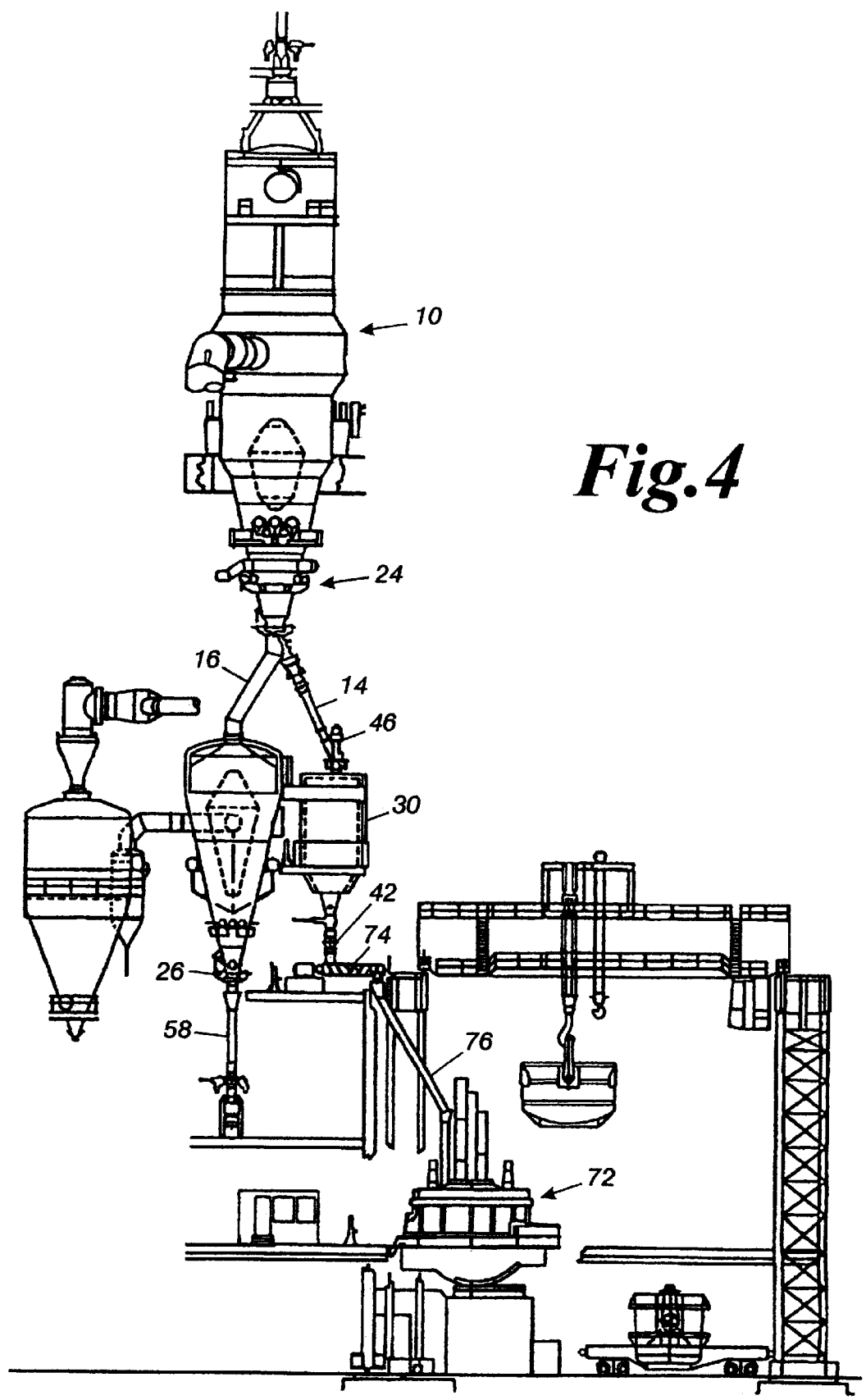
FIG. 4 is a front view of an alternative embodiment of the invention which connects a direct reduction furnace to a continuous melting furnace.
Figure 5:
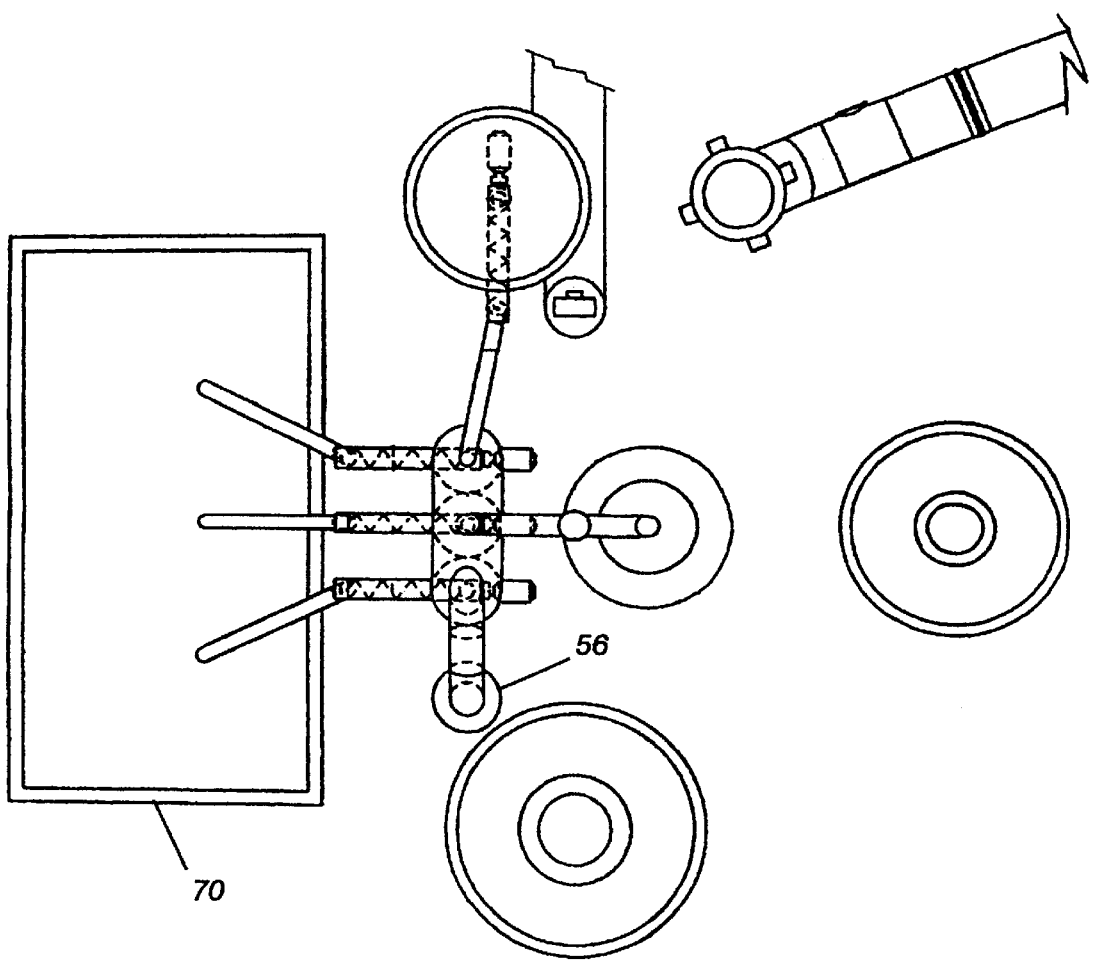
FIG. 5 is a plan view of the alternative embodiment of the invention which connects a direct reduction furnace to a continuous melting furnace.

Hot discharge conduit 14 is a seal leg having associated degassing and depressuring apparatus. Hot DRI material may be conveyed by the first discharge conduit 24 to a melting furnace. The embodiments of FIG. 2 connects the hot discharge conduit to an electric arc furnace (EAF). However, the invention will work with any melting furnace of sufficient capacity. In addition, the hot DRI material can be transported to a melting furnace by insulated containers sometimes known as "milk cans", by mechanical conveyors, or the material can be passed through a briquetting machine to form briquettes for transport.

The hot discharge conduit 14 is a sealing and conveying means that differs from the traditional lock hopper-type sealing and conveying means. The sealing and conveying means is a dynamic seal leg, which allows a single, low pressure surge vessel to be used as a receptacle instead of requiring redundant "lock hoppers".

The hot discharge conduit can discharge hot DRI into a surge bin or surge vessel 30 for temporary storage. The surge bin or surge vessel 30 has an attached bubbler 56. The bubbler 56 provides an outlet for the seal gas and prevents over pressurization of the vessel 30. The surge bin or surge vessel 40 has two discharge nozzles 38 that enable quick changeover of the hot transport vessels.

The surge bin or surge vessel 30 is refractory lined. The surge bin or surge vessel 30 has a discharge cone 40 which is preferably made from stainless steel to prevent bridging. A flow stimulator 44 is also located near the discharge of the surge vessel to prevent bridging.

In the cold discharge portion of the apparatus, hot DRI material is conveyed through the cold discharge conduit 16 to a pellet cooler 20. The DRI material is cooled in the pellet cooler 20 and discharged into an appropriate vessel for storage. The cold discharge conduit 16 is also preferably a dynamic seal leg. The dynamic seal leg isolates the pellet cooler and the inlet of the hot DRI surge vessel which is important because dynamic seal legs eliminate the need for redundant high pressure vessels and feeders in the cooling section, thus reducing the capital investment as compared to that required for similar facilities.

Gas is removed from the cooler pellet through two large off takes 52 located on top of the cooler. DRI Discharge from the cooler is accomplished by a standard DRI discharge mechanism such as vibratory feeder 26. Preferably the discharge is via a dynamic seal leg 58 beneath the discharge mechanism.

In operation, hot DRI material passes from the furnace discharge section 12 through a sealing and conveying conduit 14 in which the hot DRI is degassed and depressurized. Both the hot discharge conduit 14 and the cold discharge conduit 16 are connected to the furnace discharge section 12. The product moves by gravity to the cooler (for cold DRI), to a hot transport vessel 60 or to a melting furnace 70 or 72 (for hot DRI).

The hot DRI material that is transported to a melting furnace or a hot transport vessel moves from the direct reduction furnace through hot discharge conduit 14 which is a seal leg. The hot DRI material is conveyed from seal leg 14 to a surge bin or surge vessel 6 or before discharge into a transport vessel melting furnace. The rate of discharge is controlled by the speed of a vertical feed screw 46 at the bottom of the conduit 16.

The system is shown with hot transport vessel 60 on rails 64. Two 70- ton transport vessels can fully supply a charge for one EAF heat. Other transport methods such as a hot conveyor or a pneumatic conveyor can be also incorporated into the system.

Hot DRI material that is to be cooled is transported through cold discharge conduit 16, which may be a seal leg, into pellet cooler 20 in which the pellets are cooled. The cooled DRI material are discharged by vibrator feeder 26 through a cold discharge cone 28. The discharge rate from the pellet cooler can be changed instantaneously without affecting the process so long as the discharge rate of the furnace remains constant. The rate of discharge is set by a control system.

ALTERNATIVE EMBODIMENTS

The surge vessel arrangement can have various configurations. The surge vessel can be attached to a briquetter. In the configuration shown, a product discharge chamber or a similar device is required upstream to "screen-out" large size product, as is done in an HBI plant.

The apparatus can also utilize a product discharge chamber or a similar device when the hot transport method from the DRI furnace to a meltshop is pneumatic conveying. Pneumatic conveying cannot transport large diameter material (i.e., greater than 200 mm).

When the invention is attached to a conventional EAF, the vertical screw feeder on the inlet of the surge vessel dictates the furnace discharge rate in conjunction with the pellet cooler discharge feeder. When the invention is attached to a hot transport system or to a continuous melting furnace 70, only one screw feeder is required. Alternatively, screw feeders can be replaced by another device such as a wiper bar.

When the invention is attached to a conventional EAF 72, a horizontal screw feeder 74 is frequently utilized, which conveys discharged material from the surge vessel to the EAF or to a charging chute 76. The screw feeder 74 is used because the discharge rate from the surge vessel to the EAF is sporadic. The surge vessel is sized according to the desired EAF heat size.

SUMMARY OF THE ACHIEVEMENT OF THE OBJECTS OF THE INVENTION

From the foregoing, it is readily apparent that we have invented an improved method and apparatus for simultaneously providing both hot and cold DRI from a continuous gravity-fed supply of hot DRI material, the hot DRI being deliverable from a surge vessel at a temperature of 700° C. or higher.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. Apparatus for the simultaneous discharge of particulate hot direct reduced iron (DRI) and particulate cold DRI from a continuous supply of hot DRI, comprising:
   a furnace discharge section for receiving and discharging hot DRI, a first discharge conduit and a second discharge conduit connected to said discharge section;
   a particle cooler, said first discharge conduit communicating with said particle cooler;
   a vessel for receiving hot particulates, said second discharge conduit communicating with said vessel.

2. Apparatus according to claim 1, further comprising a plurality of burden feeders within said furnace discharge section for conveying DRI material through said discharge section to said discharge conduits.

3. Apparatus according to claim 1 wherein said first discharge conduit is a dynamic seal leg.

4. Apparatus according to claim 1 wherein the vessel for receiving hot particulates is a surge vessel which communicates with the hot discharge conduit through a vertical feed means.

5. Apparatus according to claim 4 wherein the feed means is a feed screw.

6. Apparatus according to claim 1 wherein the second discharge conduit is a dynamic seal leg.

7. Apparatus according to claim 6 further comprising means for degassing and depressurizing hot DRI in said second conduit.

8. Apparatus according to claim 1 wherein said particle cooler is provided with a discharge control mechanism.

9. Apparatus according to claim 8 wherein said discharge control mechanism is a vibratory feeder.

10. A method for the simultaneous discharge of hot direct reduced iron (DRI) material and cold DRI material from a continuous supply of hot DRI, comprising:
    providing a continuous supply of hot DRI;
    gravitationally conveying a first portion of said hot DRI hermetically through a first seal leg to a hot DRI receiving vessel;
    gravitationally conveying a second portion of said hot DRI hermetically to a hot DRI cooling vessel and forming cooled DRI product;
    discharging said cooled DRI product; and
    discharging said hot DRI from said vessel for transport, briquetting, or melting.

* * * * *